United States Patent [19]
Ashida et al.

[11] Patent Number: 5,241,440
[45] Date of Patent: Aug. 31, 1993

[54] THIN FILM MAGNETIC HEAD AND MANUFACTURING METHOD THEREFOR

[75] Inventors: Eizi Ashida, Hitachiota; Moriaki Fuyama; Hideki Yamazaki, both of Hitachi; Shinji Narishige, Mito; Makoto Morijiri, Kanagawa; Takashi Kawabe, Hitachi; Shunichiro Kuwatsuka, Odawara; Saburo Suzuki, Minamiashigara; Eisei Togawa, Odawara, all of Japan

[73] Assignee: Hitachi, Ltd., Tokyo, Japan

[21] Appl. No.: 908,607

[22] Filed: Jun. 29, 1992

Related U.S. Application Data

[63] Continuation of Ser. No. 569,023, Aug. 17, 1990, abandoned.

[30] Foreign Application Priority Data

Aug. 23, 1989 [JP] Japan .................. 1-215083

[51] Int. Cl.⁵ .............................................. G11B 5/31
[52] U.S. Cl. .................................................... 360/126
[58] Field of Search ................... 360/126, 120, 123

[56] References Cited

U.S. PATENT DOCUMENTS

| | | | |
|---|---|---|---|
| 4,751,599 | 6/1988 | Katou | 360/126 |
| 4,819,112 | 4/1989 | Iwata et al. | 360/126 |
| 5,047,886 | 9/1991 | Toyoda et al. | 360/126 |

FOREIGN PATENT DOCUMENTS

| | | | |
|---|---|---|---|
| 58-62812 | 4/1983 | Japan . | |
| 58-212616 | 12/1983 | Japan | 360/126 |
| 61-255523 | 11/1986 | Japan . | |
| 62-42311 | 2/1987 | Japan . | |

Primary Examiner—John H. Wolff
Attorney, Agent, or Firm—Antonelli, Terry, Stout & Kraus

[57] ABSTRACT

A thin film magnetic head including conductor coils, a plurality of insulating layers to interpose and insulate the conductor coils and a magnetic gap layer between upper and lower magnetic cores, in which another insulating layer is provided on a stepped region formed by end faces of the plurality of insulating layers.

16 Claims, 11 Drawing Sheets

THIN FILM MAGNETIC HEAD AND MANUFACTURING METHOD THEREFOR

This application is a continuation of application Ser. No. 569,023 filed Aug. 17, 1990, now abandoned.

BACKGROUND OF THE INVENTION

The present invention relates to a thin film magnetic head used for a magnetic recording apparatus such as a magnetic disc apparatus and a magnetic tape apparatus and, more particularly, to a thin film magnetic head including a plurality of insulating layers.

A thin film magnetic head has a tendency that the number of turns of a coil conductor is increased because writing on a recording medium such as a disc and a tape which confronts the head is performed through an intense magnetic field and a reproduction S/N (signal to noise ratio) characteristic is improved, and it also has a tendency that the number of insulating layers for insulating the coil conductor is accordingly increased.

A conventional thin film magnetic head is disclosed, for example, in Japanese Patent Unexamined publication No. 62-42311. In this example, the uppermost insulating layer is formed to have a pattern slightly larger than or substantially equal to a pattern of the lowermost insulating layer so as to form end portions of the insulating layers having a smooth face.

In another example disclosed in Japanese Patent Unexamined publication No. 58-62812, when forming insulating layers of a thin film magnetic head, photo-resist patterns are entirely exposed to light before, not after, they undergo a thermal treatment so as to obtain a smooth taper.

In a thin film magnetic head which includes insulating layers for insulating a coil conductor interposed therebetween, it has been difficult according to a conventional technique to accurately determine a position where the magnetic gap depth is zero, i.e., a position of the distal end of the selected insulating layer.

One object of the present invention is to provide a thin film magnetic head of an excellent electromagnetic conversion characteristic.

SUMMARY OF THE INVENTION

A thin film magnetic head according to the present invention is characterized in that it comprises, between upper and lower magnetic cores, a coil conductor, a plurality of insulating layers for insulating the coil conductor interposed therebetween, and a magnetic gap layer, and that it includes an additional insulating layer formed over stepped portions which are defined by end faces of the plurality of insulating layers.

The above-mentioned plurality of insulating layers are intended to insulate layers of the coil conductor from one another and the coil conductor from the magnetic cores. The expression "end faces of the plurality of insulating layers" means tilted parts of the insulating layers on a side where the thin film magnetic head confronts a recording medium.

Further, the expression "stepped portions which are defined by the plurality of insulating layers" means a region defined by end portions of the respective insulating layers.

The additional insulating layer is intended to decrease unevenness of the stepped portions which are defined by the plurality of insulating layers, and it is preferably formed over the insulating layers for insulating layers of the coil conductor from one another and the coil conductor from the magnetic cores. Besides, the additional insulating layer is not restricted to a single layer. It may be a multiple layer.

Such an additional insulating layer serves to cover the stepped portions which are defined by the end faces of the plurality of insulating layers and to decrease the unevenness in order to form a taper with a smooth face.

The thin film magnetic head according to the present invention comprises, on a substrate, at least a lower magnetic core, a magnetic gap layer, a first insulating layer, a coil conductor, a second insulating layer, and an upper magnetic core, which are preferably formed in this order.

The thin film magnetic head of the invention is not restricted to a magnetic head for both recording and reproduction. It may be used for a magnetic head for recording when providing separate structures for recording and reproduction.

The upper and lower magnetic cores for use in the thin film magnetic head according to the present invention are arranged to confront each other on one end with the magnetic gap layer interposed therebetween, while they are in direct contact with each other on the other end, and they are preferably made of a Ni, Fe or Co base magnetic material. Further, the upper and lower magnetic cores for use in the thin film magnetic head of the invention is preferably manufactured by way of a dry process.

The coil conductor for use in the thin film magnetic head of the invention is preferably arranged to be perpendicular to a magnetic path formed by the upper and lower magnetic cores, and also, the coil conductor is preferably wound a plurality of times around a back gap portion, which is formed by connecting the upper and lower magnetic cores, so that it is extended a plurality of times between the upper and lower magnetic cores. Besides, the coil conductor is preferably made of copper, gold or aluminum.

The magnetic gap layer for use in the thin film magnetic head of the invention is preferably made of an inorganic insulating material, e.g., aluminum oxide or silicon oxide.

The plurality of insulating layers formed between the upper and lower magnetic cores for use in the thin film magnetic head according to the present invention can be made of either an organic insulating material or an inorganic insulating material such as $SiO_2$. However, it is more favorable to use an organic resin, e.g., hard baked photo-resist or polyimide, or more particularly, a resin obtained when photo-resist of a positive type whose main component is phenol novolak resin, cresol novolak resin or the like is hard baked.

It is more favorable to laminate the first insulating layer, the second insulating layer, the third insulating layer, etc., with gradually smaller patterns in this order so as to arrange the ends of the insulating layers to define an angle of 30° to 50° or preferably about 40°, thereby preventing the magnetic field from leaking from areas of the head other than the distal end portion of the head and a region between the upper and lower magnetic cores.

Further, when a stepped region has a plurality of stepped portions, the insulating layers are preferably superposed on one another so that the end of the finally formed insulating layer is slightly behind the end of the insulating layer which determines the zero position of the magnetic gap depth. Thus, when the zero position of the magnetic gap depth is to be determined, this position will not be affected by the finally formed insulating layer, and consequently, the zero position of the magnetic gap depth can be determined with high accuracy.

Here, the expression "the zero position of the magnetic gap depth" means a point where the distance between the upper and lower magnetic cores confronting each other through the magnetic gap layer starts to increase, which is the outermost end of the insulating layers which confronts a recording medium.

The thin film magnetic head according to the present invention is characterized in that it includes an additional insulating layer formed over stepped portions which are defined by end faces of the plurality of insulating layers, the additional insulating layer not being in contact with the coil conductor.

The expression "the additional insulating layer is not in contact with the coil conductor" means that the additional insulating layer does not need to exercise its original function of insulating layers of the coil conductor from one another and the coil conductor from the magnetic cores.

The thin film magnetic head according to the present invention is characterized in that it includes an additional insulating layer formed over stepped portions which are defined by end faces of the plurality of insulating layers, the distal end of the additional insulating layer being located behind the distal end of one of the insulating layers which determines a magnetic gap depth.

Moreover, it is more favorable to form the insulating layer which determines the zero position of the magnetic gap depth at the forefront and to form the other insulating layers behind it.

Furthermore, it is more favorable to use different materials for manufacturing the insulating layer which determines the zero position of the magnetic gap depth and the other insulating layers, for example, an inorganic insulating material for the former and an organic insulating material for the latter.

Since the zero position of the magnetic gap depth is determined in the step of exposure and development during the formation of the insulating layers, it is preferably determined by one of the laminated insulating layers which is formed such that an elemental step on the surface of the substrate is the smallest.

The insulating layer which determines the zero position of the magnetic gap depth is preferably the lowermost one of the insulating layers formed on the surface of the substrate.

The thin film magnetic head according to the present invention is characterized in that a distance L between contact points of a tangent line connecting two adjacent insulating layers at each of stepped portions which are defined by end faces of the plurality of insulating layers and a maximum distance d between the tangent line and the stepped portion satisfy the following relation:

$$d \leq (1/15)L$$

The thin film magnetic head according to the present invention is characterized in that the distal end of the lowermost one of the plurality of insulating layers which determines the zero position of the magnetic gap depth and the distal end of the uppermost one of the plurality of insulating layers which is formed over stepped portions defined by end faces of the plurality of insulating layers each define a taper angle of 30° to 50°, a distance between the lower edge of the distal taper portion of the lowermost insulating layer and the lower edge of the distal taper portion of the uppermost insulating layer being 1 μm to 6 μm.

In order to arrange a stepped portion defined by the insulating layer which determines the zero position of the magnetic gap depth and the additional insulating layer to satisfy the above-mentioned relation $d \leq (1/15)L$, the taper of the additional insulating layer is required to have an angle of 30° to 50°, and the distance between the lower edge of the distal taper portion of the insulating layer which determines the zero position of the magnetic gap depth and the lower edge of the distal taper portion of the additional insulating layer is required to be 1 μm to 6 μm.

The thin film magnetic head according to the present invention is characterized in that each layer of the coil conductor has a coil thickness of 3 μm to 7 μm, the number of turns of each layer of the coil conductor is 10 to 20, the upper and lower magnetic cores have a magnetic path length of 90 μm to 120 μm, and a magnetic gap depth is 1 μm or less.

In consideration of the manufacture and characteristics of the thin film magnetic head, the magnetic path of the magnetic cores is required to have a length of 90 μm to 120 μm. Further, since the magnetic head includes the additional insulating layer, the function of maintaining the insulation can be separated from the function of forming the taper as a smooth face by decreasing its unevenness. Consequently, the coil thickness of each layer of the coil conductor can be 3 μm to 7 μm, and the number of turns of each layer of the coil conductor can be 10 to 20.

A manufacturing method for a thin film magnetic head according to the present invention is characterized in that it comprises the steps of forming a lower magnetic core on a substrate, forming a plurality of insulating layers which insulate a coil conductor interposed therebetween, on the lower magnetic core, and forming an upper magnetic core on the insulating layers, and that it further includes the step of forming an additional insulating layer over stepped portions which are defined by end faces of the plurality of insulating layers.

Moreover, the manufacturing method for a thin film magnetic head according to the present invention is characterized in that it includes the step of irradiating light to an additional insulating layer formed over stepped portions which are defined by end faces of the plurality of insulating layers.

Furthermore, the manufacturing method for the thin film magnetic head of the invention is characterized in that the additional insulating layer which is formed over the stepped portions defined by the plurality of insulating layers is made of positive-type photo-resist containing photo-sensitive material whose concentration is lower than that of the photo-sensitive material used in the plurality of insulating layers.

The uppermost insulating layer, which is preferably made of positive-type photo-resist, is exposed to light and developed to form a pattern, and then, only the end face of the insulating layer is exposed to light again before it undergoes a thermal treatment.

Besides, in the thin film magnetic head of the invention, it is more favorable to form a plurality of insulating layers on the uppermost layer of the coil conductor.

In general, insulating layers of a thin film magnetic head have such functions as insulation of layers of a coil conductor from one another and of the coil conductor from magnetic cores, decrease of unevenness formed by the coil conductor or the lower magnetic core, and formation of a trapezoidal cross section for forming the upper magnetic core.

Especially in the formation of the trapezoidal cross section, it is necessary to laminate a plurality of insulating layers and arrange stepped portions defined by end faces of the plurality of insulating layers to have a face as smooth as possible.

On the other hand, in order to increase the number of turns of each coil and reduce the coil resistance, it is necessary to increase the coil density and enlarge the coil thickness. Insulating layers which insulate coils interposed therebetween are required to have a larger film thickness to decrease unevenness of the coils and maintain the insulation of the coils from one another and of the coils from the magnetic cores, and also, end portions of the insulating layers are required to have a larger taper angle. As a result, the stepped portions defined by the end faces of the insulating layers will be even more largely stepped, thereby inducing deterioration of the electromagnetic conversion characteristic.

For this reason, the present invention includes, other than the insulating layers which insulate the coil conductor interposed therebetween, the additional insulating layer which fills the stepped portions defined by the end faces of the insulating layers and forms the taper as a smooth face in order to increase the coil density, enlarge the coil thickness, and reliably maintain the insulation of the coil conductor from the magnetic cores.

DESCRIPTION OF THE PREFERRED EMBODIMENT

Preferred embodiments of the present invention will be described hereinafter with reference to the accompanied drawings.

Figure 1:
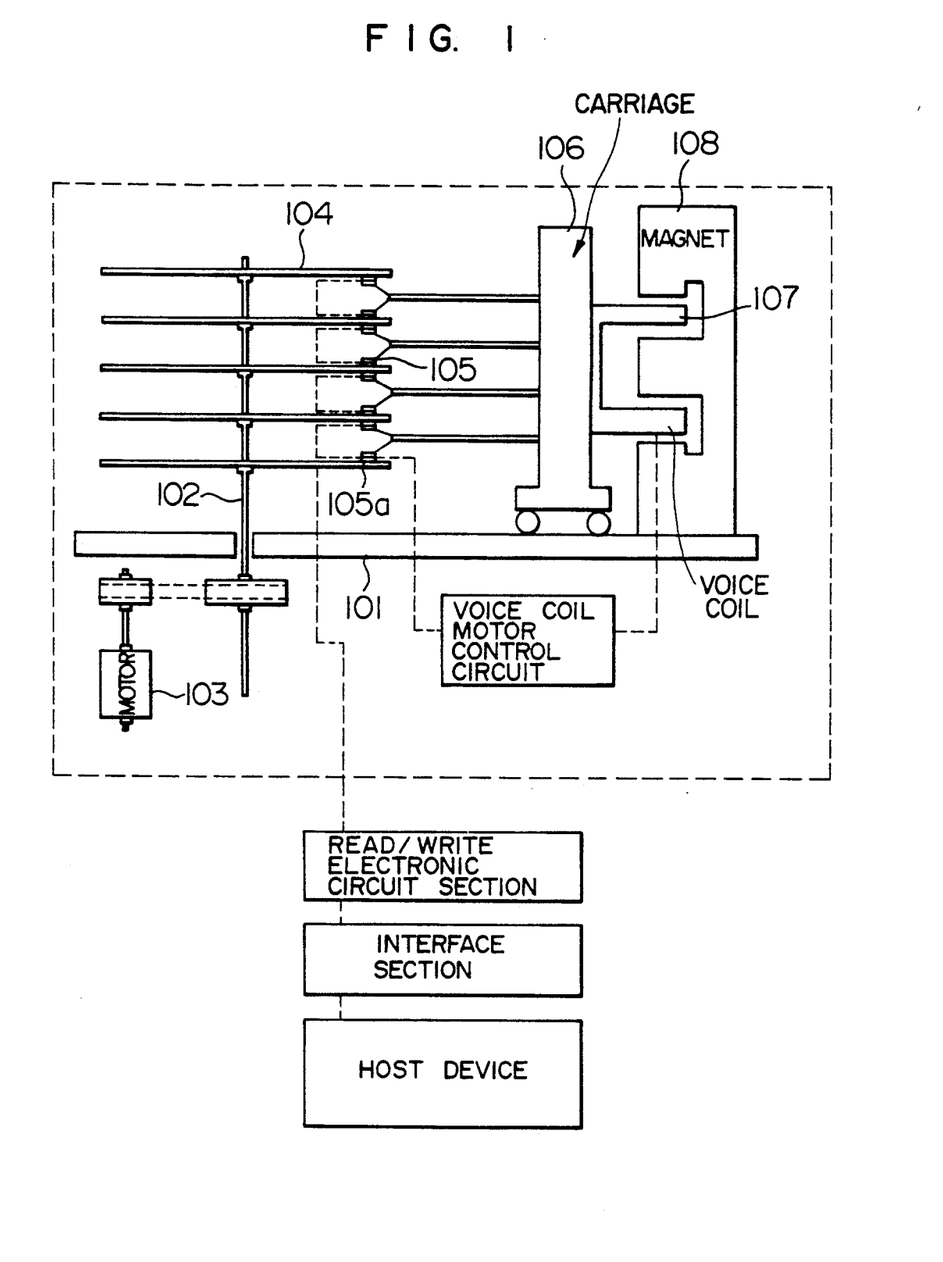
FIG. 1 is a schematic diagram of a magnetic disc storage apparatus according to the present invention.

FIG. 1 is a schematic diagram showing the structure of a magnetic disc storage apparatus according to one embodiment of the present invention.

A magnetic disc storage apparatus comprises components designated by characters 101 to 105A shown in FIG. 1 and a head disc assembly (HDA) including a voice coil motor control circuit.

Characters 101 and 102 are a base and a spindle, respectively.

A plurality of magnetic discs 104 are attached to the single spindle as shown in the figure.

There is shown in FIG. 1 an instance in which five magnetic discs are attached to one spindle 102, but the number of the discs is not restricted to five.

Also, a plurality of spindles may be disposed, each of the spindles being provided with a plurality of magnetic discs.

Character 103 is a motor for driving the spindle 102 so as to rotate the magnetic discs 104.

Character 105 designates data magnetic heads and character 105A designates a positioning magnetic head.

Characters 106, 107 and 108 are a carriage, a voice coil and a magnet, respectively.

The voice coil motor is comprised of the voice coil 107 and the magnet 108.

The heads are positioned by the components denoted by characters 106, 107 and 108.

The voice coil 107 and the positioning magnetic head 105a are connected to each other via the voice coil motor circuit.

The magnetic discs 104 are non-magnetic discs such as aluminum discs, one or both surfaces of which are provided with a magnetic layer or layers. Each magnetic layer of the magnetic discs 104 is provided with a number of track grooves. A surface recording density of the discs 104 is not less than 54 megabits per square inch. A density of the tracks is not less than 1800 tracks per inch. A track recording density is not less than 30 kilobits per inch. Within the above-mentioned track recording density and the density of tracks, the surface recording density which is a product of the track recording density and the density of tracks can be not less than 54 megabits per square inch.

In this way, the surface recording density can be multiplied without remarkably increasing the diameter of the disc.

If the surface recording density increases and a high memory capacity of information is gained so that a data transfer speed becomes slower, the magnetic disc is of little utility value. When the data transfer speed is not less than 4 megabits per second, it is possible to speedily input/output data. This data transfer speed is determined by a product of a peripheral speed and the track recording density of the disc. Since the track recording density is 30 kilobits per inch, in the case of a disc having a diameter of 8 to 11 inches, a data transfer speed not less than 4 megabits per second can be realized by setting a rotating speed of the disc at not less than 3500 rpm. This rotating speed of 3500 rpm is a value which is generally employed in an ordinary magnetic disc storage apparatus, and is extremely easy to be realized.

In FIG. 1, a host device represents, for example, a computer system which functions to process information recorded in the magnetic disc storage apparatus. A read/write circuit discriminates the write and read information and transmits signals to the magnetic disc storage apparatus. An interface section operates to connect the host device and the magnetic disc storage apparatus to each other. A system including this host device and the magnetic disc storage apparatus is an information processing system.

Figure 2:
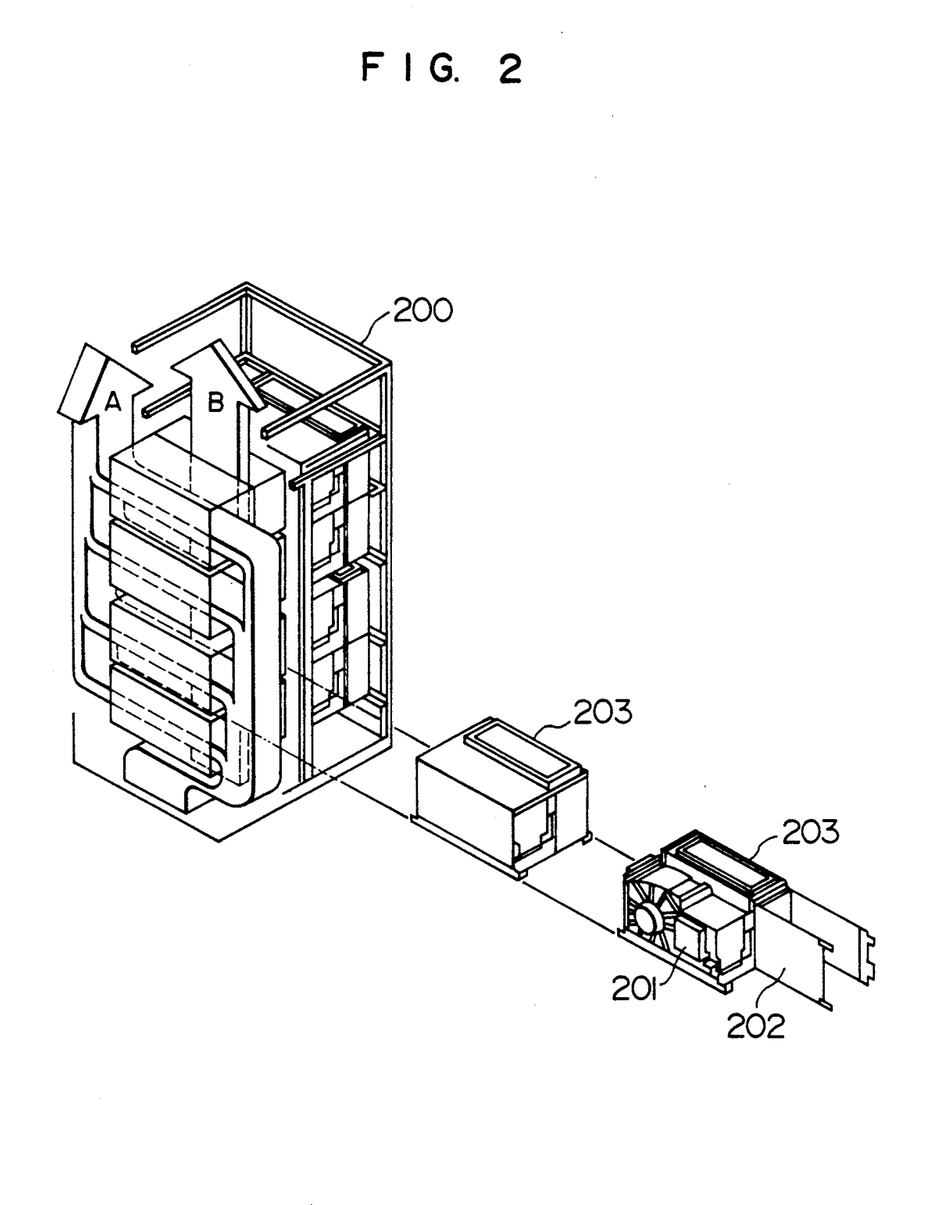
FIG. 2 is a perspective view of the magnetic disc storage apparatus.

FIG. 2 is a perspective view illustrating a state where the magnetic disc storage apparatus of the invention is contained in a predetermined-space receptacle.

A head disc assembly unit (HDU) 203 is comprised of a head disc assembly (HDA) 201 and an electronic circuit portion 202, and is received within a container 200. Eight pieces of the HDUs 203 are received in the container in two rows and four layers. The container 200 has a bottom whose side faces each include 0.5 to 1.5 m long, and a height of the container is about 2 m.

Referring to FIG. 2, arrows A and B show flows of air for supplying clean air to the HDAs and a circuit plate within the HDU.

It has been mentioned above that, according to the present invention, the thin film magnetic head of an excellent electro-magnetic conversion can be obtained. By the way, a write magnetic field with respect to the magnetic disc is enhanced. Accordingly, when it is sufficient to write in a magnetic field the same as the conventional magnetic disc storage apparatus, a thin film magnetic head can be reduced in size.

Because of the enhancement of the write magnetic field, the magnetic disc having a larger coercive force can be used so that it is possible to make recording at a higher line density.

Further, thanks to such high recording density in the disc, a total capacity of the magnetic disc storage apparatus is remarkably increased, thereby providing a magnetic disc storage apparatus having a total capacity of not less than 60 gigabits.

Figure 3:
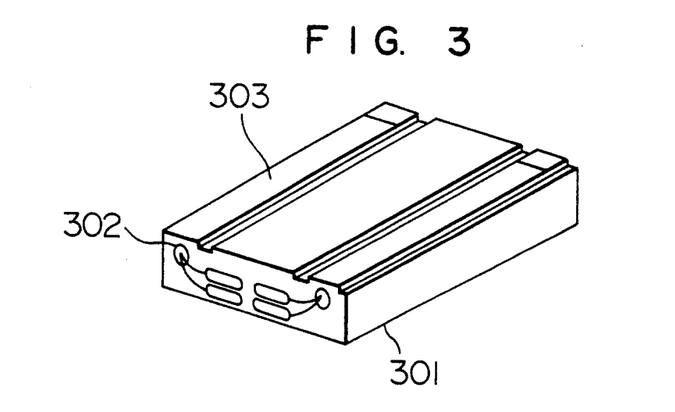
FIG. 3 is a perspective view of a slider.

FIG. 3 is a perspective view showing a state that the thin film magnetic head is formed in a predetermined slider.

Character 301 is the slider which is made of, for example, a non-magnetic ceramic. Character 302 is the thin film magnetic head. Character 303 shows a floating surface of the thin film magnetic head which is opposed to the magnetic disc.

Figure 4:
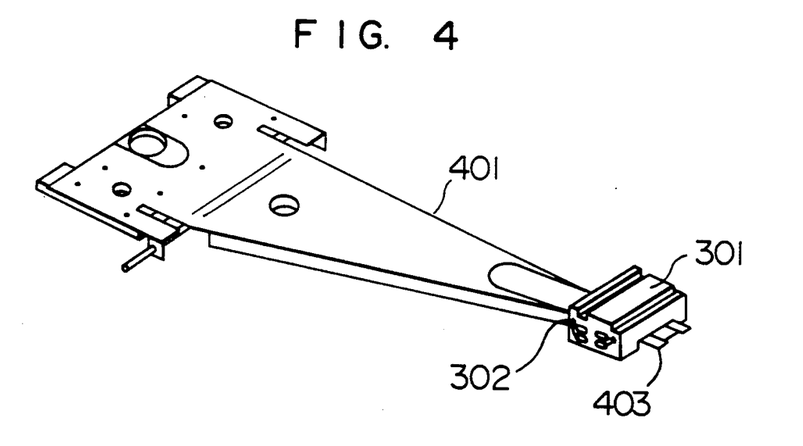
FIG. 4 is a perspective view of the slider formed on a gimbal spring.

FIG. 4 is a perspective view of the thin film magnetic head in which the slider illustrated in FIG. 3 is formed on a load arm.

Referring to FIG. 4, character 401 denotes the load arm for supporting the slider 301. Character 403 is a gimbal spring to retain a distance between the slider and the magnetic disc. The distance of the magnetic disc from the thin film magnetic head 302 formed at the tip of the slider 301 where the magnetic disc rotates is generally called the "spacing" and is one of the important factors of the performance of the magnetic disc apparatus, and with the thin film magnetic head of the present invention this spacing can be kept below 0.3 μm.

Figure 5:
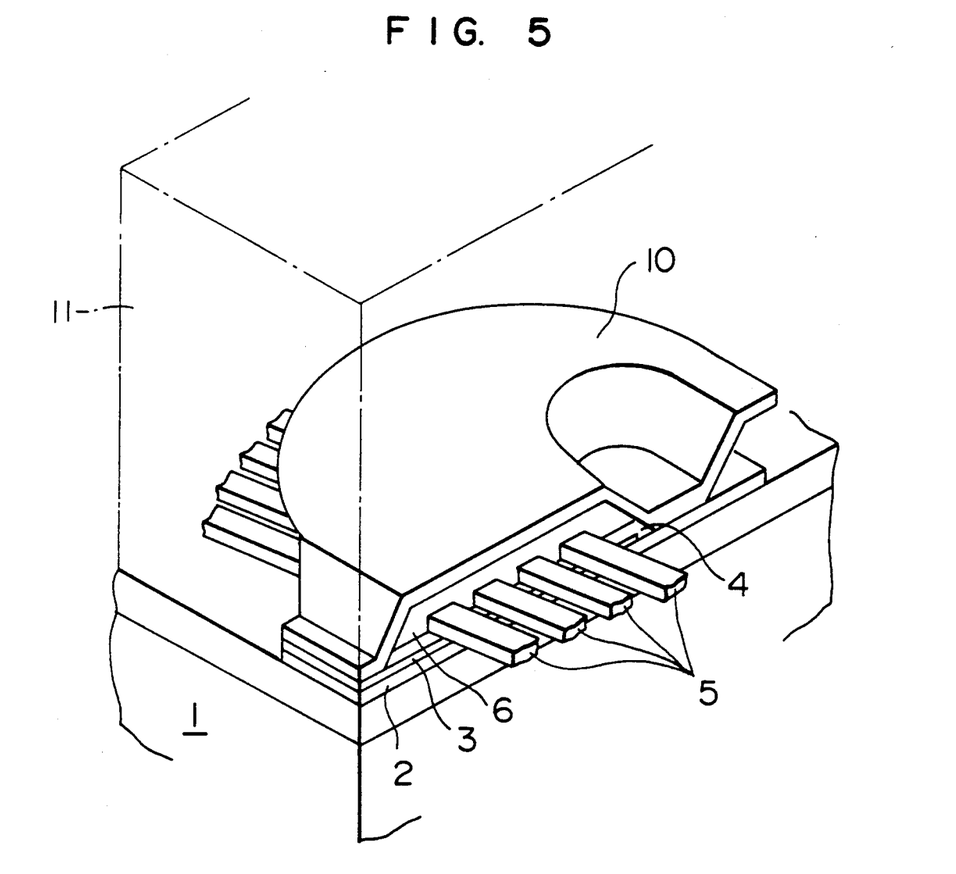
FIG. 5 is a partial perspective view of a thin film magnetic head.

FIG. 5 is a partially enlarged view of the thin film magnetic head showing in detail the magnetic head 105 of FIG. 1.

Characters 1 designates a substrate, 2 a lower magnetic core, 3 a magnetic gap layer, 4 a first insulating layer, 5 first conductor coils, 6 a second insulating layer, 10 an upper magnetic core, and 11 a protective coating, respectively.

The thin film magnetic head in FIG. 5 is of a type which includes one-layer conductor coils. A top end portion of the thin film magnetic head is illustrated in large-scale in order to facilitate understanding of the present invention. Three kinds of conductor coils including two-layer, three-layer and one-layer will be described below in order.

Figure 6:
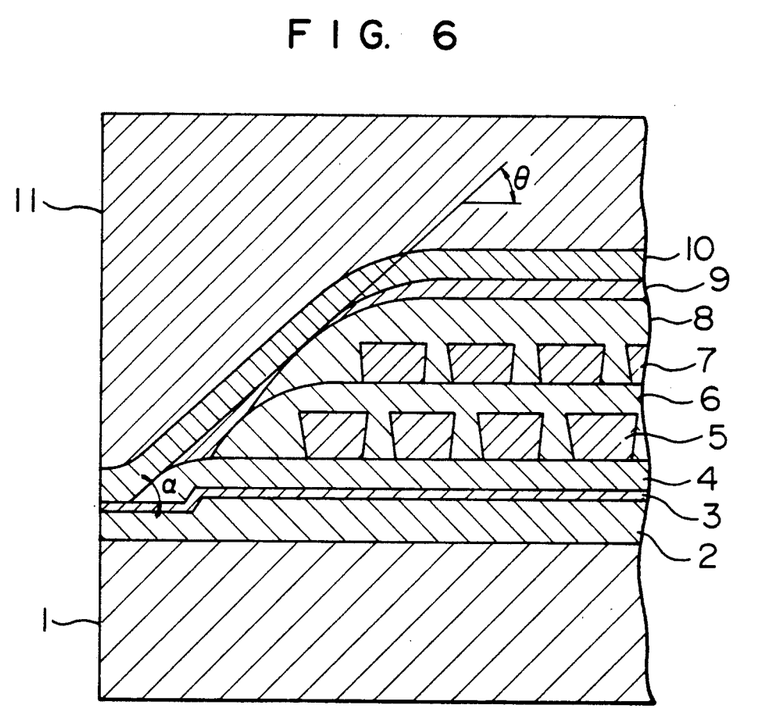
FIG. 6 is a cross-sectional view of an end of a thin film magnetic head of a two-layer coil type which is a first embodiment of the invention.

FIG. 6 is a cross-sectional view of one end portion of the thin film magnetic head including a two-layer conductor coil in accordance with the invention.

In the thin film magnetic head of the invention, the lower magnetic core 2 made of Permalloy (trademark) or the like and the magnetic gap layer 3 made of $Al_2O_3$ or the like are formed on the substrate 1 made by coating $AL_2O_3$ or the like on a ceramic substrate. The first insulating layer 4 is disposed on the magnetic gap layer 3.

In this embodiment, since an elemental thickness of a stepped end of the formed first insulating layer 4 is the smallest among the other insulating layers to be succeedingly formed, a position where a gap depth is zero is settled at the first insulating layer 4.

A first conductor coil 5 made of copper or the like is formed on the first insulating layer 4 with a flame plating method, and a second insulating layer 6 is formed on the first conductor coil to overlap the same.

Then, a second conductor coil 7 and a third insulating layer 8 are successively formed in a manner similar to the first conductor coil 7 and the second insulating layer 6.

Subsequently, a fourth insulating layer 9 is provided for filling up a stepped region formed by the end faces of the first, second and third insulating layers. The fourth insulating layer 9 overlaps at its end portion the first insulating layer 4 and is formed on the rear side from the position where the magnetic gap depth is zero.

An upper magnetic core 10 made of Permalloy or the like is formed on the insulating layers formed in the above-described manner, and a protective coating 11 made of $Al_2O_3$ or the like is provided on the upper magnetic core 10.

Further, the end face of the first insulating layer 4 formed on the magnetic gap layer 3 is determined as the position where the magnetic gap depth is zero. The stacked-layer body formed by this way is ground at a predetermined extent from the contact end face or the side surface opposite to the recording medium, so as to manufacture the thin film magnetic head.

According to the present invention, since the position where the magnetic gap depth is zero is not influenced by the stacked insulating layers, several dozen thin film magnetic heads can be processed simultaneously as well as precisely so that an operation efficiency of processing the magnetic gap depth is raised and a yield rate of the final products is also improved.

A taper angle Θ shown in FIG. 6 is determined depending on a height from the first insulating layer 4 to the third insulating layer 8 and a laminating position at tapered end portions of the second insulating layer 6 and the third insulating layer 8. Since the insulation effect between the conductor coil and the upper and lower magnetic cores is ensured by the first to third insulating layers, the fourth insulating layer may be formed at least only at the tapered portion.

A rising taper angle α of the thin film magnetic head which has a great influence on a strength of the recording magnetic field is determined by the taper angle of the insulating layer for settling the position where the magnetic gap depth is zero, that is, the first insulating layer 4 in this embodiment.

The thin film magnetic head of the invention may be arranged in such a manner that a longitudinal length of the insulating layers interposed between the upper and lower magnetic cores, a so-called magnetic path length may be 90 to 120 μm, the number of turns of the conductor coil of each layer is 10 to 20, and the height of each conductor coil is 3 to 7 μm. In view of insulation requirements, the distances between the conductor coil layers, the conductor coil and the upper magnetic core, and the conductor coil and the lower magnetic core may be 1.5 μm.

Moreover, the thin film magnetic head manufactured by the present invention includes a smoothly tapered configuration.

Photoresist of a positive-type containing cresol novolak resin as a main component is used to form the insulating layers. After coating the photoresist, the coated photoresist layer is subjected for patterning treatment to form the layer having a predetermined shape by a photolithograph technique, and then heat-treated at a temperature of 240° to 280° C.

The taper angles of the end faces of the insulating layers are controlled by changing the temperature of the heat treatment and the concentration of a sensitive material in the photoresist.

Figure 7:
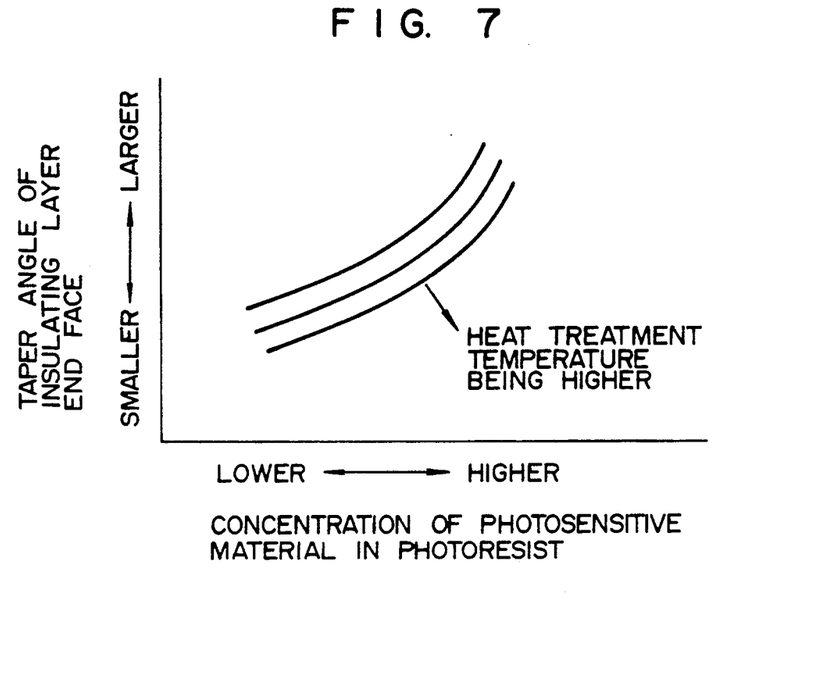
FIG. 7 is a diagram showing a relation between the concentration of a photosensitive material in a photoresist and a taper angle of the end face of an insulating layer.

FIG. 7 shows a relationship between the concentration of the sensitive material in the photoresist and the taper angle of the end face of the insulating layer. It is understood from this diagram that the taper angle of the end face of the insulating layer becomes larger when the concentration of the sensitive material in the photoresist increases. It is also recognized that the taper angle of the end face of the insulating layer becomes smaller when the temperature in the heat treatment is raised.

In order to make smooth the tapered portion of the end face of the fourth insulating layer, it is preferable that a photoresist to be used for the fourth insulating layer has a better fluidity than the photoresist for forming the other insulating layers Therefore, the photoresist containing an amount of a sensitive material less than the photoresist for the other insulating layers is used for the fourth insulating layer.

Figure 8:
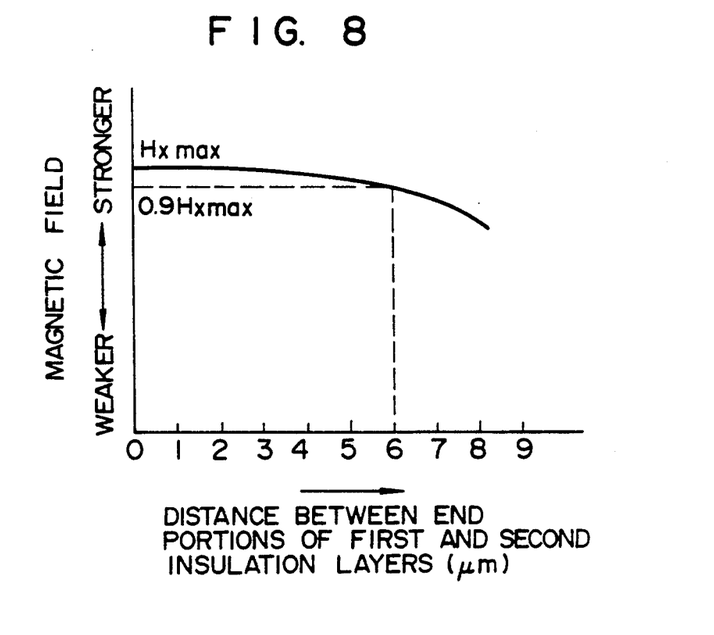
FIG. 8 is a diagram indicating a relation between a distance between the end portions of the insulating layers and a recording magnetic field.

Referring to FIG. 8, there is illustrated a relationship between the recording magnetic field and a distance between the end portions of the first and fourth insulating layers. It is understood that the recording magnetic field scarcely varies, when the distance between the end portions of the first and fourth insulating layers is in the range of 0 to 3 μm and that the recording magnetic field tends to decrease when the distance surpasses the value of 3 μm. From these results, it is also understood that the end portions of the first and fourth insulating layers can be spaced at a distance of 0 to 6 μm when taking into account the case where the maximum value of the recording magnetic field is diminished by 10%, in conjunction with the standard level of the recording magnetic field which is put into practical use. However, the fourth insulating layer influences an accuracy in the position where the magnetic gap depth is zero when the distance is 0 μm. It is thus preferable that the distance is set at a range of 1 to 6 μm, in view of a positioning precision during the patterning treatment.

Figure 9:
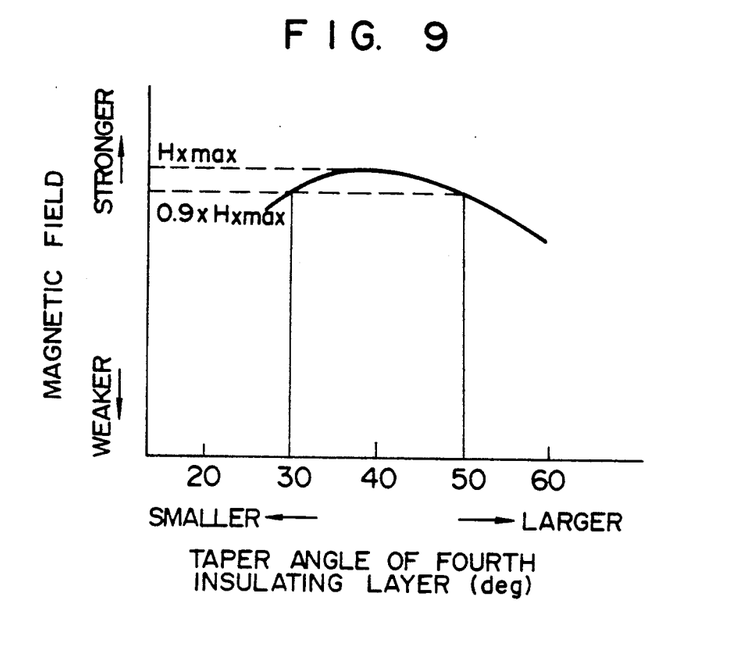
FIG. 9 is a diagram illustrating a relation between the taper angle of the insulating layer and the recording magnetic field.

FIG. 9 denotes a relationship between the recording magnetic field and the taper angle of the fourth insulating layer. In consideration of the case where the maximum value of the recording magnetic field is reduced by 10%, with respect to the standard of the recording magnetic field, it is preferable that the taper angle is set at a range of 30° to 50°. Besides, the item "recording magnetic field" means a magnetic field strength output from the end of the magnetic head.

Figure 10:
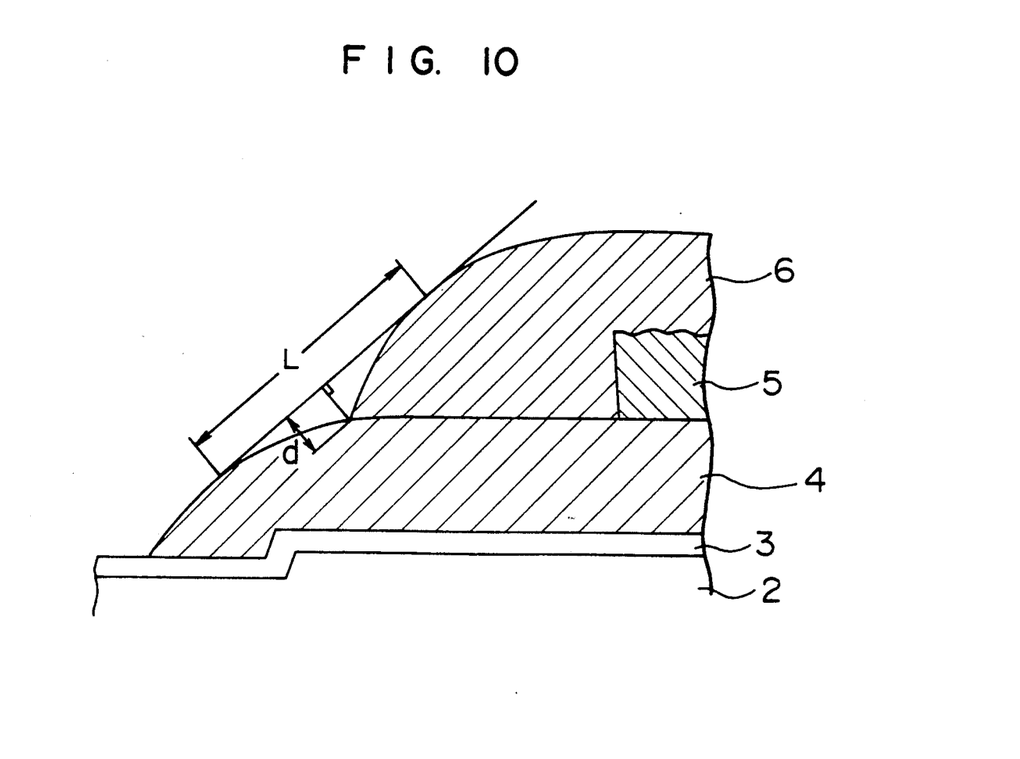
FIG. 10 is a schematic view of a stepped portion at the end portions of the insulating layers.

A length on the step between the insulating layer end face created by the first insulating layer 4 and the second insulating layer 6 is measured and the relation between the stepped length and a recording/reproducing characteristic is diagrammatically illustrated in FIG. 10.

As shown in FIG. 10, if a relationship between a length L and the maximum distance d to the surface of the stepped region, the length L being determined between two contact points of a tangent line connecting the adjacent taper end surfaces formed by the first insulating layer 4 and the second insulating layer 6, satisfies the following relation:

$$d \leq (1/15)L,$$

a deterioration in the recording/reproducing characteristic can be restrained within 10%. When there is no contact point between the tangent line of the second insulating layer 6 and the convex portion of the first insulating layer 4, the position where the magnetic gap depth is zero is regarded as the contact point of the first insulating layer.

Accordingly, the deterioration of the magnetic characteristic can be effectively prevented.

In this embodiment, two insulating layers are existing above the second conductor coil 7, but the number of the layers may be increased for the purpose of flattening the shape of the tapered region.

A positioning accuracy of the zero position of the magnetic gap depth of the thin film magnetic head according to the invention was measured in comparison with a photomask pattern of the first insulating layer determining the zero position of the magnetic gap depth. From the results, a positioning accuracy of ±0.1 μm and a processing accuracy of the magnetic gap depth of ±0.2 μm. Thus, a thin film magnetic head having the magnetic gap depth of 1 μm or less could be obtained.

When the tapered region at the end portion of the upper magnetic core was observed by a method for the magneto-optic imaging of magnetization, there existed no saturation in the magnetic field and no turbulence in the magnetic domain, and a stabilized magnetization was obtained.

According to the present invention, since the stepped region formed by the end faces of the plurality of insulating layers are evened by the other insulating layer and a smoothly tapered portion can be obtained, the upper magnetic core provided on the tapered portion can be formed as a smooth surface so that an electromagnetic transfer characteristic is improved and such a problem as an occurrence of noise is solved.

Further, it is made possible by the invention to wind the conductor coils multiply, to reduce resistance, to subject the magnetic gap depth to highly precise control, and to make the magnetic gap narrower.

As a result, S/N characteristic of the thin film magnetic head used for recording/reproducing is improved so that a magnetic recording device loaded with this thin film magnetic head can be increased in capacity and in recording/reproducing speed.

Figure 11:
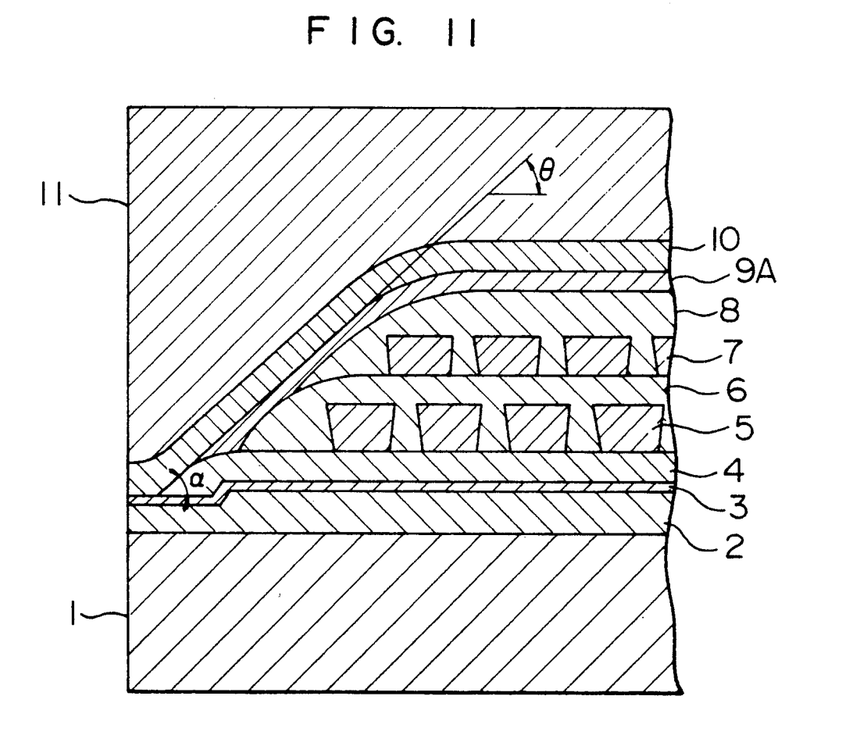
FIG. 11 is a cross-sectional view showing another embodiment of the invention.

Further, as illustrated in FIG. 11, it is possible to form a fourth insulating layer 9A so as to extend over the end portions of the third insulating layer 8 and the second insulating layer 6.

Figure 12:
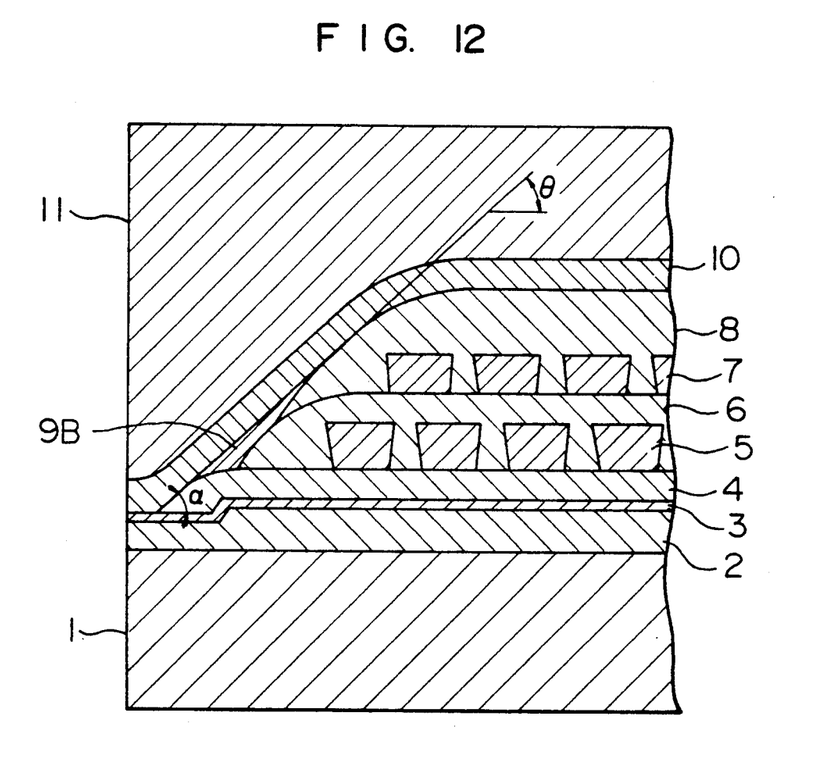
FIG. 12 is a cross-sectional view showing still another embodiment of the invention.

Referring to FIG. 12, a fourth insulating layer 9B may be provided only at a portion overlapping the end portions of the third insulating layer 8 and the second insulating layer 6.

One preferred embodiment of a method for manufacturing the thin film magnetic head of the invention, for example, the thin film magnetic head shown in FIG. 12, will be described with reference to FIGS. 13A, 13B, 13C and 13D.

A thin film magnetic head illustrated in these figures is that of a two-layer coil type in which an insulating layer is provided on the second conductor coil in one layer.

Figure 13A:
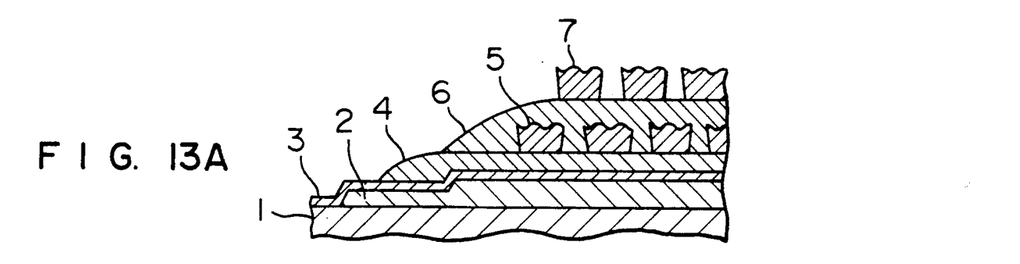
FIGS. 13A, 13B, 13C and 13D are views denoting manufacturing steps of the thin film magnetic head which is one embodiment of the invention.

First, as shown in FIG. 13A, a lower magnetic core 2, a magnetic gap layer 3, a first insulating layer 4, a first conductor coil 5, a second insulating layer 6 and a second conductor coil 7 are provided on a substrate 1 in the order. In this embodiment, a position where the magnetic gap depth is zero is settled at a position of the end of the first insulating layer 4.

Figure 13B:
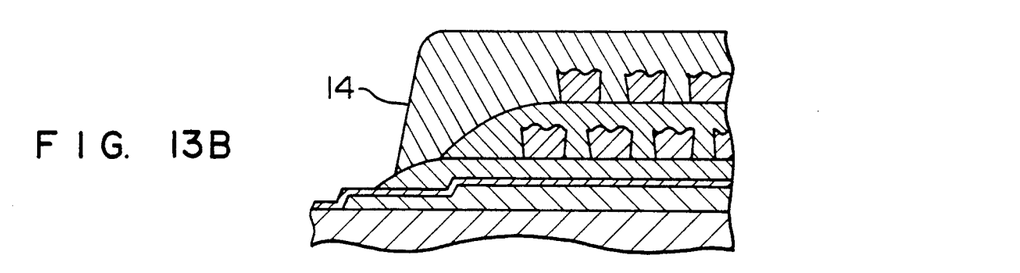

Next, as shown in FIG. 13B, a photoresist pattern 14 is coated with a predetermined thickness to overlap a first insulating layer 4 at its end portion by the photolithography technique.

Figure 13C:
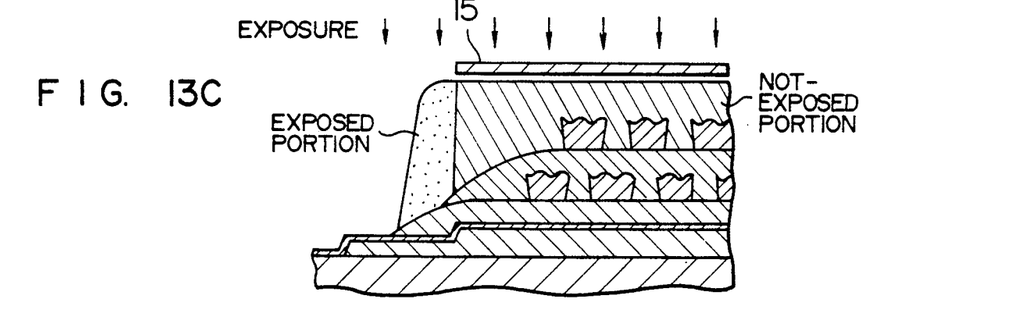

Successively, as the understood from FIG. 13C, the photoresist pattern 14 is exposed with a photomask 15 being covered thereon in such a manner that only an end portion of the photoresist pattern is irradiated by light, for example, ultraviolet light.

The end portion of the photoresist pattern 14 is sensitized and photosensitive radicals of the sensitive material contained in the photoresist are dissolved.

An arc-like extension of the surface of the photoresist pattern which is created by exposure of the whole surface of the photoresist pattern is prevented by exposure of only the end portion of the photoresist pattern 14. The exposure of only the end portion of the photoresist pattern is executed for ensuring insulation between the second conductor coil 7 and an upper magnetic core formed on the third insulating layer 8 as well as for forming the tapered portion of the third insulating layer 8 as a smooth surface.

An exposing amount is required to be selected appropriately in correspondence to the film thickness of the photoresist pattern. The photoresist pattern is preferably exposed at a rate of 1.5 to 2.0 times of a normal case, in the process of re-exposure, that is, in the process of exposing only the end portion of the photoresist pattern 14.

Figure 13D:
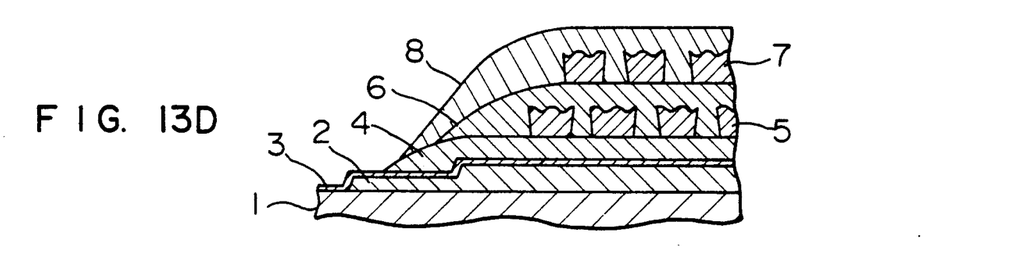

Then, the photoresist pattern is heat treated at the temperature of 250° C. for an hour whereby the third insulating layer 8 is obtained, as shown in FIG. 13D.

The end portion of the photoresist pattern which is exposed by light is formed into a more smoothly tapered portion than a portion which is not exposed, because of an increase in fluidity during heating by heat treatment.

In this embodiment, an exposing distance at the end portion of the photoresist pattern is preset at 6 μm. A distance between the lower end of a tapered portion of the first insulating layer and the lower end of the tapered portion of the third insulating layer is predetermined at 2 to 4 μm. Here, the term "exposing distance" means a distance between the end portion lower end of the photoresist pattern 14 and the end portion of the photomask 15.

According to the present invention, it is possible to precisely form the magnetic gap depth at a predetermined extent, which magnetic gap is one factor having an influence over the magnetic characteristic of the thin film magnetic head, by grinding the thin film head from its end portion.

Further, an operating efficiency of processing the magnetic gap depth is improved and several ten pieces of thin film magnetic heads with the desired magnetic gap depths can be processed simultaneously.

A position of the top end portion of the insulating layer for settling a position of the magnetic gap depth is determined precisely.

Because a stepped length is so reduced as not to influence the magnetic characteristic, such a thin film magnetic head can be obtained that a recording/reproducing efficiency is high, an overwrite characteristic is favorable, and distortions are created in reproduced waveforms.

Moreover, since a position where the magnetic gap depth is zero is determined precisely, a yield rate in the magnetic gap depth processing can be enhanced.

Further, another embodiment of the thin film magnetic head according to the invention will be explained with reference to FIG. 14.

Figure 14:
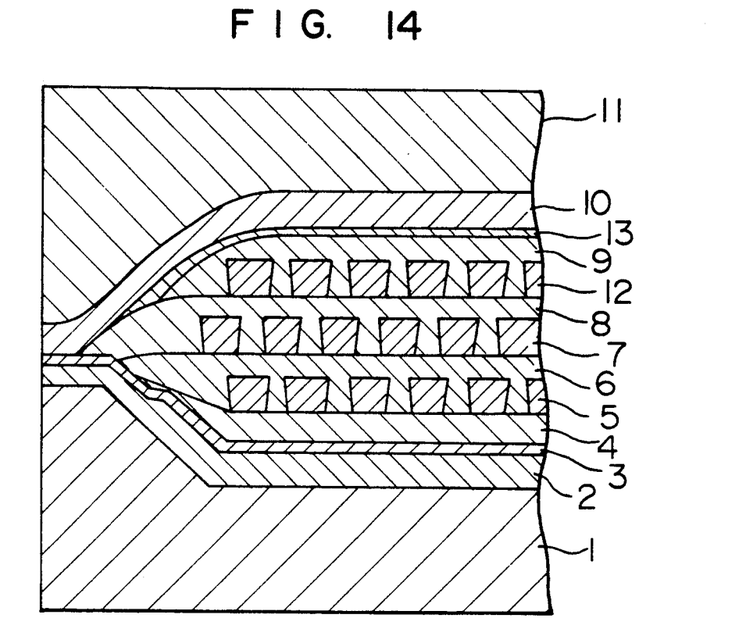
FIG. 14 is a cross-sectional view of an end of a thin film magnetic head of a three-layer coil type which is a further embodiment of the invention.

FIG. 14 shows a cross section of an end portion of a thin film magnetic head of a three-layer coil type in which a lower magnetic core, a magnetic gap layer, an insulating layer and a part of a conductor coil are buried in a substrate.

The thin film magnetic head exemplified by this embodiment is formed in such a manner that a groove is bored in a layer of $Al_2O_3$ provided on the ceramic substrate 1 and that the lower magnetic core 2 and the magnetic gap layer 3 are formed within the bored groove. The end portion of the lower magnetic core 2 is located on the substrate 1.

Next, a first insulating layer 4, a first conductor coil 6, a second insulating layer 5, a second conductor coil 7, a third insulating layer 8, a third conductor coil 12, a fourth insulating layer 9 and a fifth insulating layer 13 are successively provided in a manner similar to the thin film magnetic head shown in FIG. 6.

In this embodiment, since an elemental thickness of a stepped end of the formed third insulating layer 8 is the smallest, a position where the gap depth is zero is determined at the position of the third insulating layer 8. A stepped region created on the end faces of the third insulating layer 8 and the fourth insulating layer 9 is overlapped with the fifth insulating layer 13 so that a smoothly tapered portion is formed.

A taper angle between the third insulating layer 8 and the fifth insulating layer 13 is 40°±10°, and a distance between the end portions of the third and fourth insulating layers 8 and 9 at the lower end of the tapered portion is 1 to 6 μm. These values are similar to those of the thin film magnetic head illustrated in FIG. 6.

Successively, an upper magnetic core 10 and a protective coating 11 are provided to thereby finish the thin film magnetic head.

In the thin film magnetic head according to this embodiment, a length of a magnetic path was 105 μm, a coil height was 5 μm, the number of coil turns of the first, second and third layers were 12, 14 and 12, respectively, and thus the total is 38.

In accordance with the present invention, the insulating layer for determining the position where the magnetic gap depth is zero can be formed in a state that the elemental thickness of the stepped end is small so that a high patterning accuracy and a preferable magnetic characteristic are realized.

Figure 15:
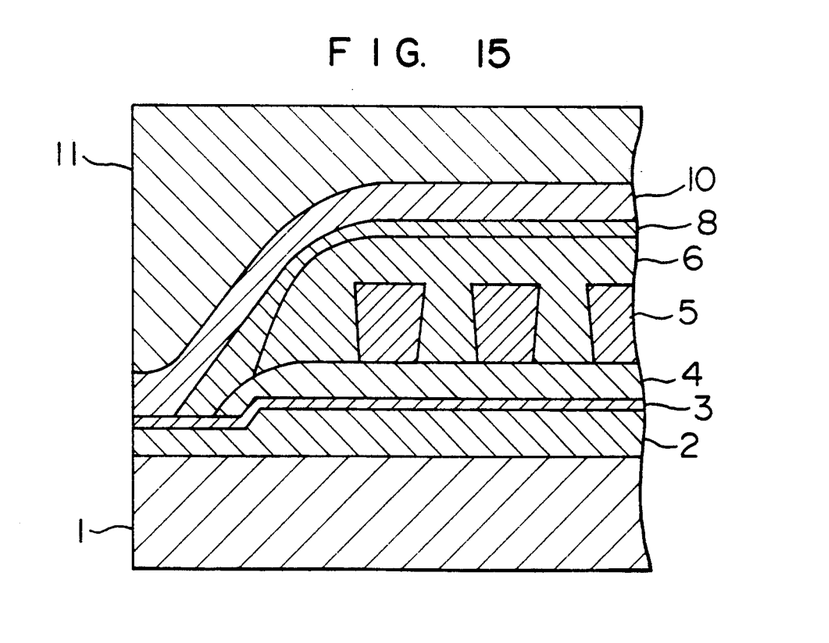
FIG. 15 is a cross-sectional view of an end of a thin film magnetic head of a one-layer coil type which is a further embodiment of the invention.

Referring to FIG. 15, a further embodiment of the thin film magnetic head of the invention will be described.

FIG. 15 shows a cross section of an end portion of a thin film magnetic head of a one-layer coil type.

The thin film magnetic head used in the invention is arranged in such a manner that a lower magnetic core 2 and a magnetic gap layer 3 are formed on a ceramic substrate 1, and a first insulating layer 4 is disposed on the magnetic gap layer 3, and further a first conductor coil 5 is provided on the first insulating layer 4.

Then, a second insulating layer 6 is formed so as to cover the first conductor coil 5, and a third insulating layer 8 is provided for overlapping a stepped region formed by end faces of the second insulating layer 6 and the first insulating layers and a protective coating 11 is provided thereon, whereby the thin film magnetic head is produced.

As mentioned above, the present invention can provide the thin film magnetic head including a preferable magnetic transfer characteristic.

What is claimed is:

1. A thin magnetic head having a recording face, comprising:
    an upper magnetic core and a lower magnetic core having respective tip portions exposed at the recording face;
    a coil conductor having a plurality of coil turns disposed between the upper magnetic core and the lower magnetic core;
    a plurality of insulating layers insulating the coil conductor from the upper magnetic core and the lower magnetic core and insulating the coil turns of the coil conductor from each other, the insulating layers being superimposed one upon another to produce steps at ends of the insulating layers nearest the recording face; and
    an additional insulating layer disposed at least on the steps to produce a smooth surface over the steps.

2. A thin film magnetic head according to claim 1, wherein the additional insulating layer does not contact the coil conductor.

3. A thin film magnetic head according to claim 1, wherein one insulating layer of the plurality of insulating layers has an end nearest the recording face with respect to the plurality of insulating layers and determines a magnetic gap depth of the thin film magnetic head, and wherein an end nearest the recording face of the additional insulating layer is further from the recording face than the end nearest the recording face of the one insulating layer.

4. A thin film magnetic head according to claim 3, wherein the end nearest the recording face of the one insulating layer and the end nearest the recording face of the additional insulating layer each define a taper angle of 30° to 50°, and wherein a distance between the end nearest the recording face of the one insulating layer and the end nearest the recording face of the additional insulating layer is 1 μm to 6 μm.

5. A thin film magnetic head according to claim 4, wherein the one insulating layer is a lowermost insulating layer among the plurality of insulating layers.

6. A thin film magnetic head according to claim 1, wherein the coil conductor includes at least one layer of coil turns, each layer having 10 to 20 coil turns and a thickness of 3 μm to 7 μm, and wherein the upper magnetic core and the lower magnetic core provide a magnetic path length of 90 μm to 120 μm and a magnetic gap depth of no more than 1 μ.

7. A thin film magnetic head according to claim 1, wherein a distance L between tangent points at which a tangent line contacts adjacent steps of the steps produced by the superimposed insulating layers and a maximum distance d between the tangent line and a surface of the adjacent steps between the tangent points satisfies the relation $d = (1/15)L$.

8. A thin film magnetic head according to claim 1, wherein the additional insulating layer is disposed only on the steps.

9. A thin film magnetic head according to claim 1, wherein one insulating layer of the plurality of insulating layers has an end nearest the recording face with respect to the plurality of insulating layers, wherein the end nearest the recording face of the one insulating layer and an end nearest the recording face of the additional insulating layer each define a taper angel of 30° to 50°, and wherein a distance between the end nearest the recording face of the one insulating layer and the end nearest the recording face of the additional insulating layer is 1 μm to 6 μm.

10. A thin film magnetic head according to claim 9, wherein the one insulating layer is a lowermost insulating layer among the plurality of insulating layers.

11. A thin magnetic head having a recording face, comprising:
    an upper magnetic core and a lower magnetic core having respective tip portions exposed at the recording face;
    a coil conductor having a plurality of coil turns disposed between the upper magnetic core and the lower magnetic core;
    a plurality of insulating layers insulating the coil conductor from the upper magnetic core and the lower magnetic core and insulating the coil turns of the coil conductor from each other, the insulating layers being superimposed one upon another to produce steps at ends of the insulating layers nearest the recording face;
    wherein a distance L between tangent points at which a tangent line contacts adjacent steps of the steps produced by the superimposed insulating layers and a maximum distance d between the tangent line and a surface of the adjacent steps between the tangent points satisfies the relation $d \leq (1/15)L$ so that a smooth surface is obtained when an additional insulating layer is disposed on the steps.

12. A thin magnetic head having a recording face, comprising:
    an upper magnetic core and a lower magnetic core having respective tip portions exposed at the recording face;
    a coil conductor having a plurality of coil turns arranged in a plurality of layers disposed between the upper magnetic core and the lower magnetic core;

a plurality of insulating layers insulating the coil conductor from the upper magnetic core and the lower magnetic core and insulating the coil turns of the coil conductor from each other, the insulating layers being superimposed one upon another to produce steps at ends of the insulating layers nearest the recording face; and an additional insulating layer disposed at least on the steps to produce a smooth surface over the steps.

13. A thin magnetic head having a recording face, comprising:

an upper magnetic core and a lower magnetic core having respective tip portions exposed at the recording face, wherein the lower magnetic core has a rear portion located further away from the recording face than the tip portion of the lower magnetic core, and wherein the rear portion of the lower magnetic core is disposed at a lower position in the thin film magnetic head than the tip portion of the lower magnetic core;

a coil conductor having a plurality of coil turns arranged in a plurality of layers disposed between the upper magnetic core and the lower magnetic core;

a plurality of insulating layers insulating the coil conductor from the upper magnetic core and the lower magnetic core and insulating the coil turns of the coil conductor from each other, the insulating layers being superimposed one upon another to produce steps at ends of the insulating layers nearest the recording face; and an additional insulating layer disposed at least on the steps to produce a smooth surface over the steps.

14. A magnetic disc apparatus comprising:
a magnetic disc for storing information;
means for rotating the magnetic disc;
a thin film magnetic head for recording information on the magnetic disc; and
means for moving the thin film magnetic head to a desired position on the magnetic disc;
wherein the thin film magnetic head has a recording face and includes:

an upper magnetic core and a lower magnetic core having respective tip portions exposed at the recording face;

a coil conductor having a plurality of coil turns disposed between the upper magnetic core and the lower magnetic core;

a plurality of insulating layers insulating the coil conductor from the upper magnetic core and the lower magnetic core and insulating the coil turns of the coil conductor from each other, the insulating layers being superimposed one upon another to produce steps at ends of the insulating layers nearest the recording face; and an additional insulating layer disposed at least on the steps to produce a smooth surface over the steps.

15. A magnetic disc apparatus comprising:
a magnetic disc for storing information;
means for rotating the magnetic disc;
a thin film magnetic head for recording information on the magnetic disc; and
means for moving the thin film magnetic head to a desired position on the magnetic disc;
wherein the thin film magnetic head has a recording face and includes:

an upper magnetic core and a lower magnetic core having respective tip portions exposed at the recording face;

a coil conductor having a plurality of coil turns arranged in a plurality of layers disposed between the upper magnetic core and the lower magnetic core;

a plurality of insulating layers insulating the coil conductor from the upper magnetic core and the lower magnetic core and insulating the coil turns of the coil conductor from each other, the insulating layers being superimposed one upon another to produce steps at ends of the insulating layers nearest the recording face; and an additional insulating layer disposed at least on the steps to produce a smooth surface over the steps.

16. A magnetic disc apparatus comprising:
a magnetic disc for storing information;
means for rotating the magnetic disc;
a thin film magnetic head for recording information on the magnetic disc; and
means for moving the thin film magnetic head to a desired position on the magnetic disc;
wherein the thin film magnetic head has a recording face and includes:

an upper magnetic core and a lower magnetic core having respective tip portions exposed at the recording face, wherein the lower magnetic core has a rear portion located further away from the recording face than the tip portion of the lower magnetic core, and wherein the rear portion of the lower magnetic core is disposed at a lower position in the thin film magnetic head than the tip portion of the lower magnetic core;

a coil conductor having a plurality of coil turns arranged in a plurality of layers disposed between the upper magnetic core and the lower magnetic core;

a plurality of insulating layers insulating the coil conductor from the upper magnetic core and the lower magnetic core and insulating the coil turns of the coil conductor from each other, the insulating layers being superimposed one upon another to produce steps at ends of the insulating layers nearest the recording face; and an additional insulating layer disposed at least on the steps to produce a smooth surface over the steps.

* * * * *